(12) United States Patent
Dey et al.

(10) Patent No.: US 10,511,543 B2
(45) Date of Patent: Dec. 17, 2019

(54) SYSTEMS AND METHODS FOR DYNAMIC SEMANTIC RESOURCE DISCOVERY IN FOG-ROBOT NETWORKS

(71) Applicant: Tata Consultancy Services Limited, Mumbai (IN)

(72) Inventors: Sounak Dey, Kolkata (IN); Arijit Mukherjee, Kolkata (IN); Abhijan Bhattacharyya, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 171 days.

(21) Appl. No.: 15/901,963

(22) Filed: Feb. 22, 2018

(65) Prior Publication Data

US 2018/0316628 A1 Nov. 1, 2018

(30) Foreign Application Priority Data

Apr. 28, 2017 (IN) .............................. 201721015117

(51) Int. Cl.
| | |
|---|---|
| *G06F 15/173* | (2006.01) |
| *H04L 12/911* | (2013.01) |
| *G06F 17/27* | (2006.01) |
| *B25J 9/16* | (2006.01) |
| *H04L 29/08* | (2006.01) |

(52) U.S. Cl.
CPC ............ *H04L 47/82* (2013.01); *B25J 9/1661* (2013.01); *G06F 17/2785* (2013.01); *H04L 67/10* (2013.01)

(58) Field of Classification Search
USPC ....... 709/203, 206, 217, 219, 223, 224, 226, 709/228, 230, 232, 238
See application file for complete search history.

(56) References Cited

U.S. PATENT DOCUMENTS

| 8,850,052 B2 | 9/2014 | Rosenblatt et al. |
| 2005/0289097 A1* | 12/2005 | Trossen ................. H04L 41/06 |
| | | (Continued) |

FOREIGN PATENT DOCUMENTS

EP 2 696 559 2/2014

OTHER PUBLICATIONS

Furthmüller, J. et al. "Energy-aware resource sharing with mobile devices," *2011 Eighth International Conference on Wireless On-Demand Network Systems and Services (WONS)*, Bardonecchia, Italy, Jan. 26-28, 2011; pp. 1920-1934.

*Primary Examiner* — Quang N Nguyen
(74) *Attorney, Agent, or Firm* — Finnegan, Henderson, Farabow, Garrett & Dunner LLP

(57) ABSTRACT

Systems and methods of the present disclosure enable exchange of semantic knowledge of resource data and task data between heterogeneous resources in a constrained environment wherein cloud infrastructure and cloud based knowledge repository is not available. Ontology based semantic knowledge exchange firstly enables discovery of available resources in real time. New tasks may evolve at runtime and so also resource data associated with the resources may vary over time. Systems and methods of the present disclosure effectively address these dynamic logistics in a constrained environment involving heterogeneous resources. Furthermore, based on the required resource data for each task and the available resources discovered in real time, task allocation can be effectively handled.

18 Claims, 6 Drawing Sheets

(56) References Cited

U.S. PATENT DOCUMENTS

| | | | |
|---|---|---|---|
| 2014/0156638 A1* | 6/2014 | Joshi | G06F 16/254 707/722 |
| 2015/0286969 A1* | 10/2015 | Warner | G06Q 10/0633 705/7.27 |
| 2018/0096255 A1* | 4/2018 | Duggimpudi | G06N 7/005 |
| 2018/0300425 A1* | 10/2018 | Azmi | G06N 5/022 |
| 2019/0267118 A1* | 8/2019 | Miled | G16H 15/00 |
| 2019/0287000 A1* | 9/2019 | Smith | G06N 5/022 |

\* cited by examiner

SYSTEMS AND METHODS FOR DYNAMIC SEMANTIC RESOURCE DISCOVERY IN FOG-ROBOT NETWORKS

PRIORITY CLAIM

This U.S. patent application claims priority under 35 U.S.C. § 119 to: Indian Patent Application No. 201721015117, filed on 28 Apr. 2017. The entire contents of the aforementioned application are incorporated herein by reference.

TECHNICAL FIELD

The embodiments herein generally relate to fog-robot networks, and more particularly to systems and methods for dynamic semantic resource discovery in fog-robot networks.

BACKGROUND

Transition of Internet from human-centric exchanges to the Internet of Things has posed several challenges regarding communication models and data exchange patterns. Emergence of edge/fog computing as a computation model has further added to the complexities involved on account of the inherent heterogeneity of participating devices. In several domains, the devices may range from standard computing and communication devices to gateways/switches, as well as robots/drones and other types of autonomous entities. In scenarios like disaster management, warehouse automation, surveillance, and the like, use of robots/drones/AGVs/UAVs is steadily increasing in order to minimize potentially hazardous human intervention. Optimality of data exchange and further processing is a desired feature in such scenarios, especially in outdoor disaster situations where availability of back-end cloud infrastructure cannot be guaranteed.

SUMMARY

Embodiments of the present disclosure present technological improvements as solutions to one or more of the above-mentioned technical problems recognized by the inventors in conventional systems.

In an aspect, there is provided a processor implemented method comprising: capturing mission related data by a plurality of resources in a fog-robot network; capturing resource data associated with the plurality of resources in real time; performing at least one of (a) identifying contextually, one or more tasks to be performed based on the captured mission related data and (b) receiving one or more tasks to be performed based on the captured mission related data; identifying task relevant data from the captured resource data and the identified one or more tasks, the task relevant data comprising a set of sub-tasks associated with each of the tasks and required resource data for executing the tasks; updating in real time, an ontology based semantic knowledge repository of the task relevant data, the one or more tasks and the captured resource data in one or more of the plurality of resources; and dynamically discovering in real time, one or more of the plurality of resources as available resources based on the semantic knowledge repository.

In another aspect, there is provided a system comprising: one or more data storage devices operatively coupled to the one or more processors and configured to store instructions configured for execution by the one or more processors to: capture mission related data by a plurality of resources in a fog-robot network; capture resource data associated with the plurality of resources in real time; perform at least one of (a) identifying contextually, one or more tasks to be performed based on the captured mission related data and (b) receiving one or more tasks to be performed based on the captured mission related data; identify task relevant data from the captured resource data and the one or more tasks, the task relevant data comprising a set of sub-tasks associated with each of the tasks and required resource data for executing the tasks; update in real time, an ontology based semantic knowledge repository of the task relevant data, the one or more tasks and the captured resource data in one or more of the plurality of resources; and dynamically discover in real time, one or more of the plurality of resources as available resources based on the semantic knowledge repository.

In yet another aspect, there is provided a computer program product comprising a non-transitory computer readable medium having a computer readable program embodied therein, wherein the computer readable program, when executed on a computing device, causes the computing device to: capture mission related data by a plurality of resources in a fog-robot network; capture resource data associated with the plurality of resources in real time; perform at least one of (a) identifying contextually, one or more tasks to be performed based on the captured mission related data and (b) receiving one or more tasks to be performed based on the captured mission related data; identify task relevant data from the captured resource data and the one or more tasks, the task relevant data comprising a set of sub-tasks associated with each of the tasks and required resource data for executing the tasks; update in real time, an ontology based semantic knowledge repository of the task relevant data, the one or more tasks and the captured resource data in one or more of the plurality of resources; and dynamically discover in real time, one or more of the plurality of resources as available resources based on the semantic knowledge repository.

In an embodiment of the present disclosure, wherein the resource data comprises static capabilities and run time capabilities associated with the plurality of resources.

In an embodiment of the present disclosure, wherein the ontology based semantic knowledge repository is based on a peer-to-peer network paradigm.

In an embodiment of the present disclosure, wherein the ontology based semantic knowledge repository of the task relevant data, the one or more tasks and the captured resource data is a Web Ontology Language (OWL) and Resource Description Framework (RDF) based tuple data store.

In an embodiment of the present disclosure, the one or more hardware processors are further configured to create the ontology based semantic knowledge repository.

In an embodiment of the present disclosure, the one or more hardware processors are further configured to identify contextually or receive the one or more tasks to be performed based on the semantic knowledge repository.

In an embodiment of the present disclosure, the one or more hardware processors are further configured to exchange semantic knowledge between the semantic knowledge repository and one or more of the plurality of resources.

In an embodiment of the present disclosure, the one or more hardware processors are further configured to allocate in real time the one or more tasks to one or more of the plurality of resources based on the dynamically discovered available resources.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

Figure 1:
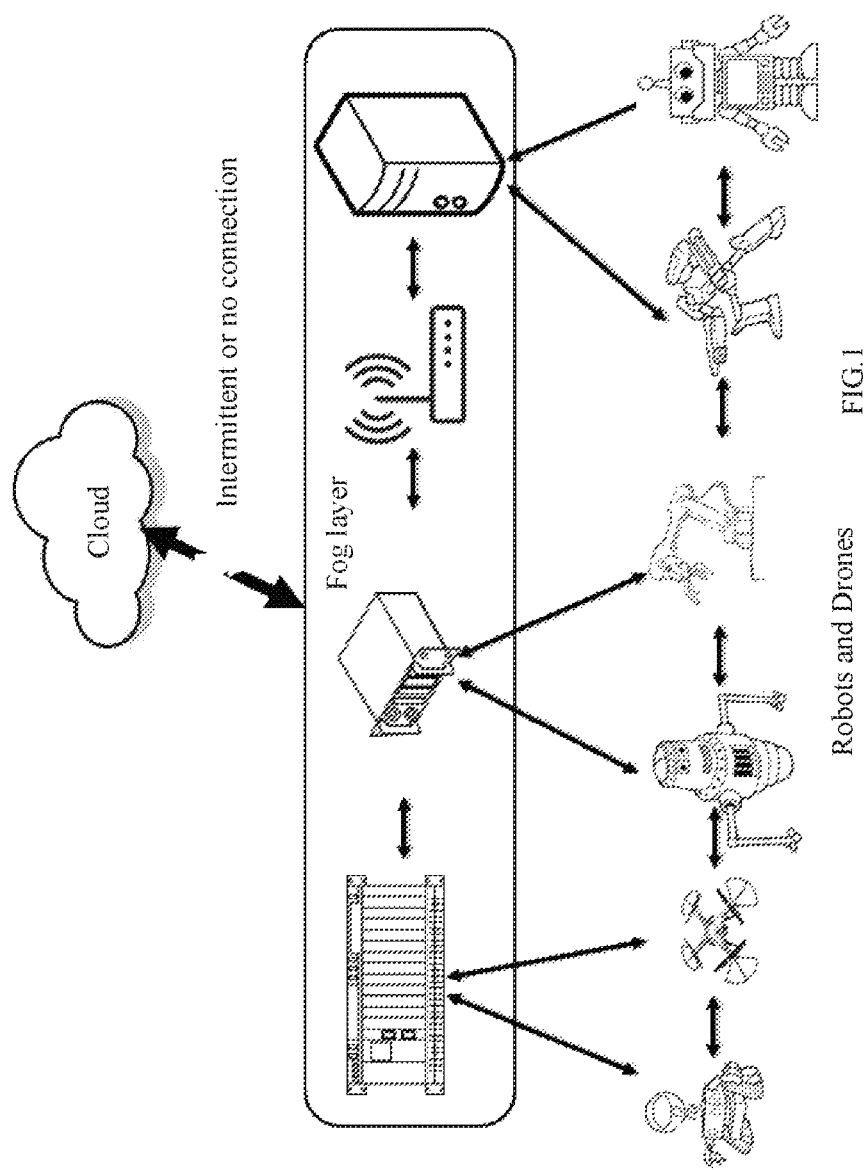
FIG. 1 illustrates an exemplary representation of a fog-robot network in absence of cloud.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Conventionally available collaborative robotics are primarily based on cloud-based knowledge centric architectures where knowledge gathered by one robot is stored in a cloud-based knowledge repository and shared with other robots. However such systems have two drawbacks: (i) introduction of cloud raises round-trip latency; hence knowledge sharing is not real time, and (ii) assumption of constant connectivity to the cloud may not be true in real scenarios. The drawbacks limit effectiveness of conventional systems in outdoor emergency situations where connectivity cannot be guaranteed and tasks must be completed within reasonable time without manual intervention. For instance, consider a scenario wherein a team of resources like robots and drones are deployed at a disaster zone for search and rescue operations where the tasks are to identify, map and label obstacles, trapped human beings, other hazards such as fire, inflammable objects, etc. without any human intervention. The resources have to perform the tasks involving computation of complex algorithms and storage of data. Systems and methods of the present disclosure address such a scenario wherein the tasks may be performed collaboratively with minimal or no dependency on the cloud and hence without dependence on a central coordinator, by prioritizing and distributing tasks across resources based on analyses of real time sensor data and available resource capabilities. Resource capabilities, in the context of the present disclosure, refer to computation power, memory, storage, mechanical capabilities, node location, current drawn during computation and communication, total battery capacity, number of CPU cores and CPU operating frequency, and the like, hereinafter referred to as resource data. Systems and methods of the present disclosure also utilize edge computing by leveraging fog devices such as routers, gateways, base stations, and the like, available in the neighborhood, thus adding more diverse workforce to the heterogeneous resources.

FIG. 1 illustrates an exemplary representation of a fog-robot network in the absence of cloud. Members of a fog-robot network, hereinafter referred to as resources, need to exchange real time information like observation data, tasks or action plans and capability information. Such communication in a fog-robot network gets complex owing to the heterogeneity of the resources involved. Furthermore, collaborative robot-drone-fog devices in a fog-robot network need bi-directional communication which is a challenge.

Systems and methods of the present disclosure provide a real-life Resource Description Framework (RDF) model for exchanging semantic knowledge between heterogeneous resources of a fog-robot network based on ontologies. Referring now to the drawings, and more particularly to FIGS. 2 through 5, where similar reference characters denote corresponding features consistently throughout the figures, there are shown preferred embodiments and these embodiments are described in the context of the following exemplary system and method.

Figure 2:
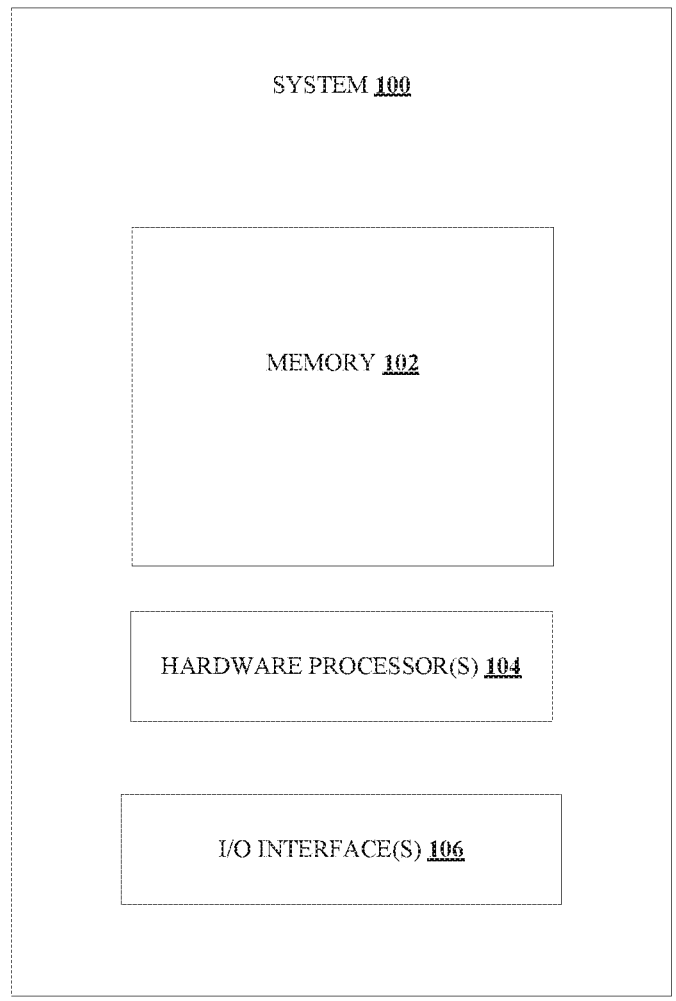
FIG. 2 illustrates an exemplary block diagram of a system for dynamic semantic resource discovery in fog-robot networks, in accordance with an embodiment of the present disclosure.

FIG. 2 illustrates an exemplary block diagram of a system 100 for dynamic semantic resource discovery in fog-robot networks, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 3A:
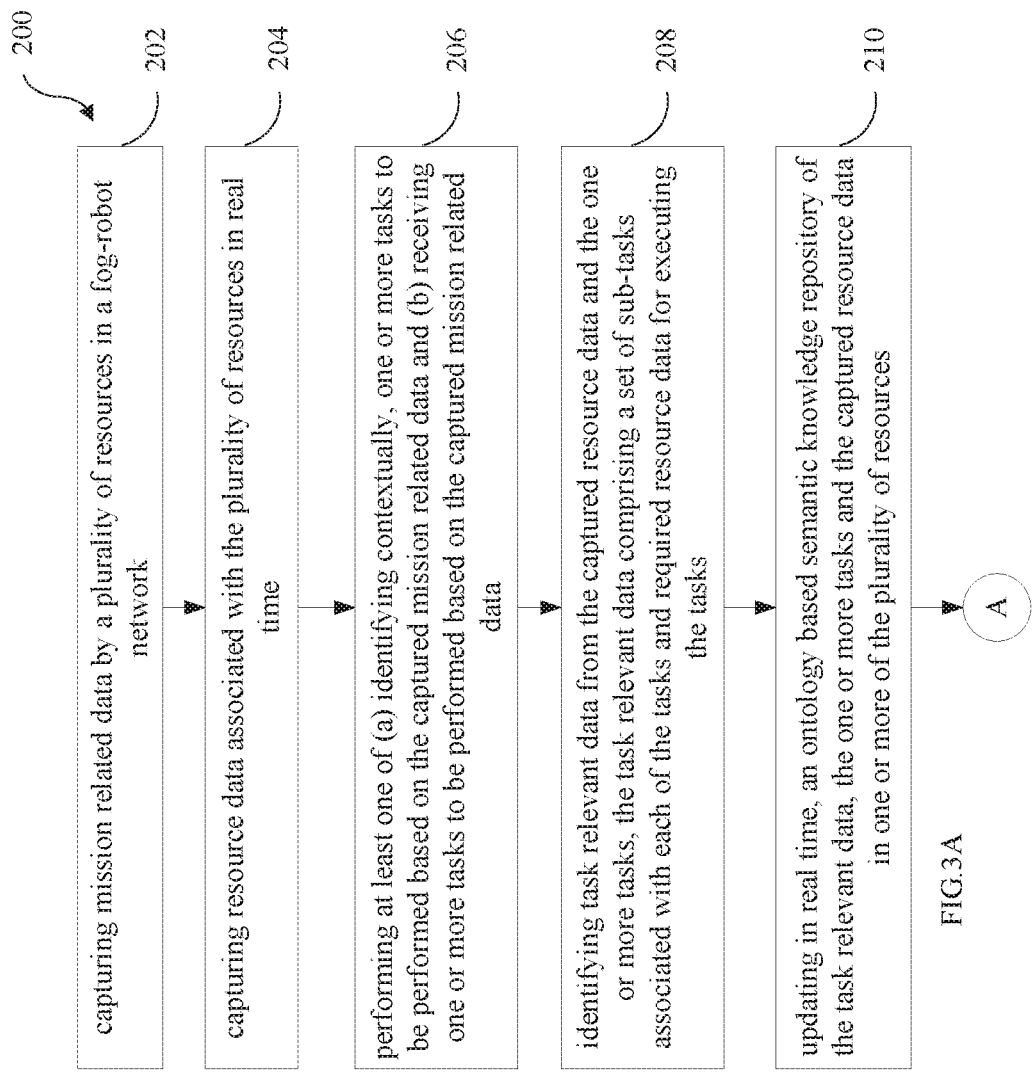
FIG. 3A and FIG. 3B is an exemplary flow diagram illustrating a computer implemented method for dynamic semantic resource discovery in fog-robot networks, in accordance with an embodiment of the present disclosure.
Figure 3B:
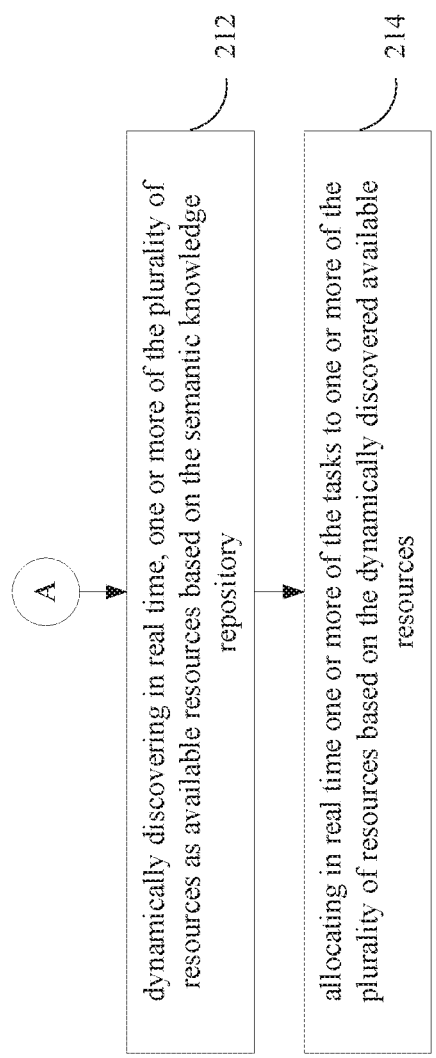

FIG. 3A and FIG. 3B is an exemplary flow diagram illustrating a computer implemented method 200 for dynamic semantic resource discovery in fog-robot networks, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

The present disclosure particularly addresses scenarios wherein cloud infrastructure is not available and fog and edge resources like gateways, routers, switches, and the like are available in a collaborative fog-robot network for being deployed on a mission. In accordance with an embodiment of the present disclosure, the one or more processors 104 are configured to capture, at step 202, mission related data by a plurality of resources in a fog-robot network. The mission related data may include data captured by the heterogeneous devices comprising the fog-robot network such as image data, sensor data, and the like.

In an embodiment, the one or more processors 104 are configured to capture, at step 204, resource data associated with the plurality of resources in real time. Resource data, as stated herein above may include computation power, memory, storage, mechanical capabilities, node location, current drawn during computation and communication, total battery capacity, number of CPU cores and CPU operating frequency, and the like associated with each of the plurality of resources. Resource data, in accordance with the present disclosure, thus comprises static capabilities and run time capabilities associated with the plurality of resources. For instance, the resource data for a robot may include carrying capacity associated thereof as 50 Kg. Another exemplary resource data for a gateway may include its memory as 2 GB.

In an embodiment, the one or more processors 104 are configured to perform, at step 206, at least one of identifying contextually or receiving one or more tasks to be performed based on the captured mission related data. For instance, the tasks may comprise identifying, mapping and labeling obstacles, trapped human beings, other hazards such as fire, inflammable objects, and the like. Each of the tasks may also involve sub-tasks. The tasks may be received by the system 100 or identified contextually by the system 100. For instance, on capturing a mission related data in the form of a sensed temperature that has a value greater than a pre-defined threshold, a task indicative of moving a robot away from the associated hot zone may be identified, or a task pertaining to initiating a fire extinguishing task may be evolved. In an embodiment, the step 206 is based on the knowledge comprised in the semantic knowledge repository.

In an embodiment, the one or more processors 104 are configured to identify, at step 208, task relevant data from the captured resource data and the one or more tasks. The one or more tasks are mapped to resource data associated with one or more of the plurality of resources. In an embodiment, the task relevant data may therefore comprise a set of sub-tasks associated with each of the tasks and required resource data for executing the tasks. Identification of task relevant data ensures use of resources effectively both in terms of storage as well as computation.

In accordance with the present disclosure, for seamless communication between the plurality of resources in the fog-robot network, that are heterogeneous, any exchange has to be in a common machine interpretable format. Each sensor in a resource like robot (or a drone) publishes data following its own standard format. Specific code modules are required to understand, parse and process the data to derive any meaning from the data. Furthermore, change in sensor type or data format triggers recoding of the underlying codes. The methods of the present disclosure therefore, represent the data structure in a standard semantic schema or ontology. Again, for tasks like say, map merging, the resources such as robots and drones may need to send camera observations to a fog node which has enough memory to store such image (or video) data and enough processing power to run an efficient map merging algorithm on those image data. To identify a resource to perform such task, available computational and/or storage capabilities of each of the plurality of resources needs to be known. Heterogeneous set of resources may have varying capabilities. The present disclosure implements Resource Description Framework (RDF) for communication between the heterogeneous resources.

RDF typically abides by standard ontologies. Efforts have been made to create ontologies for robotic tasks and actions and for robotic motor capabilities. However, conventionally known ontologies do not capture all capabilities of resources, particularly for resources such as fog devices and robots under consideration during run time and particularly not capabilities such as computation power, available memory, and the like.

Figure 4:
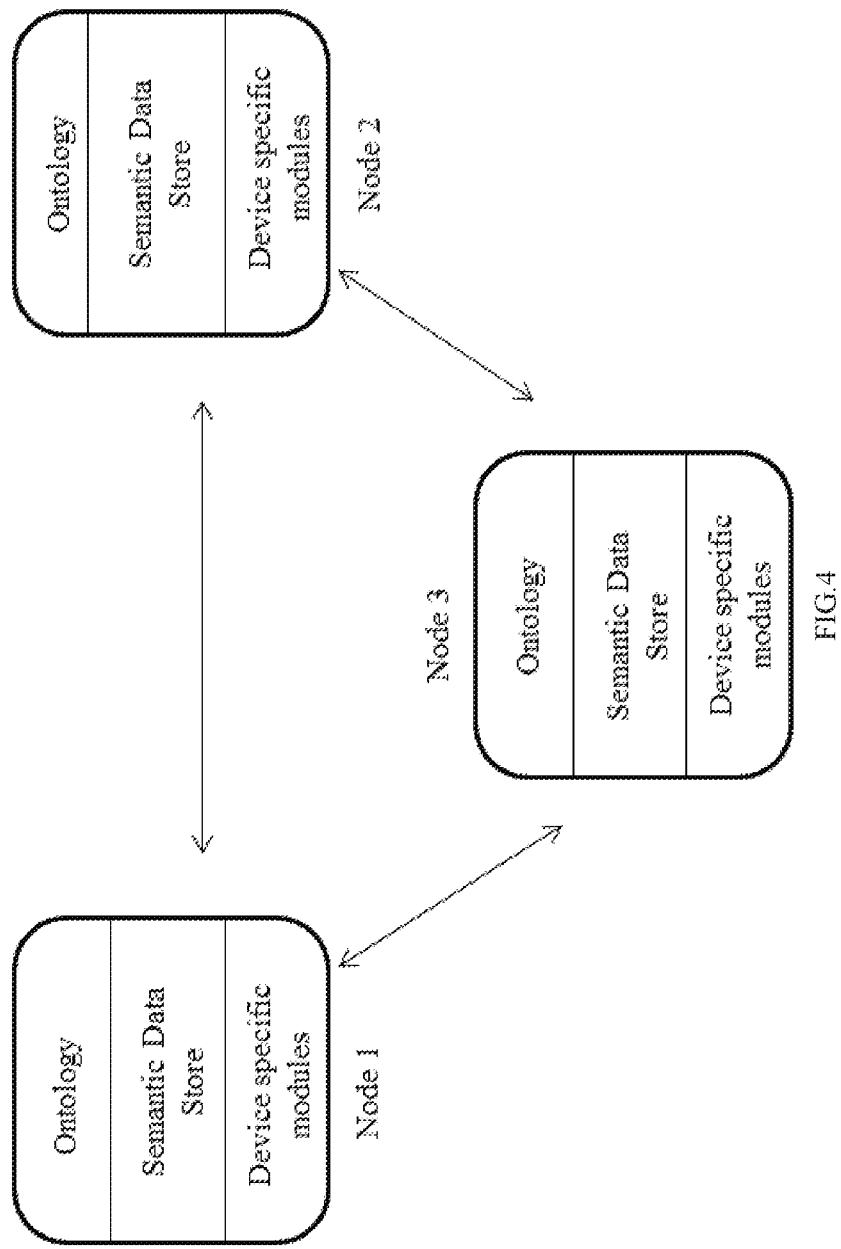
FIG. 4 illustrates a schematic representation of a distributed structure for an ontology based semantic knowledge repository implemented at the fog layer in accordance with an embodiment of the present disclosure.

In an embodiment, the one or more processors 104 are configured to create an ontology based semantic knowledge repository, wherein the ontology is written in Web Ontology Language (OWL) and the semantic knowledge repository is Resource Description Framework (RDF) based tuple data store. The ontology based semantic knowledge repository of the present disclosure is based on a peer-to-peer network paradigm. FIG. 4 illustrates a schematic representation of a distributed structure for the ontology based semantic knowledge repository implemented at the fog layer in accordance with an embodiment of the present disclosure. Although semantic knowledge repository may be implemented with a distributed structure as illustrated, in another embodiment, it may also be implemented centrally in a single resource identified as a capable resource or as a central task introducer based on the resource data received for each of the plurality of resources. Furthermore, having the semantic knowledge repository at the fog layer instead of cloud layer averts dependency on cloud connectivity which may be absent or may be intermittent at times.

In an embodiment, the one or more processors 104 are configured to update, at step 210, the ontology based semantic knowledge repository of the task relevant data, the one or more tasks and the captured resource data in real time. The semantic knowledge repository may be implemented in one or more of the plurality of resources as explained herein above. In accordance with the present disclosure, real time exchange of semantic knowledge between the semantic knowledge repository and one or more of the plurality of resources facilitates intelligent automation of operation of the fog-robot network.

In an embodiment, the one or more processors 104 are configured to dynamically discover, at step 212, one or more of the plurality of resources as available resources in real time based on the real time exchange of semantic knowledge between the semantic knowledge repository and one or more of the plurality of resources. Amongst the multiple types of information comprised in the resource data, information pertaining to sensor observation data, partial map data, task details and plans, etc. that can be exchanged amongst the heterogeneous resources of the fog-robot network and capability information is of particular importance. Generally, static capabilities like carrying capability, moving capability, sensing capability etc. are recorded at the beginning of a complex task and then single atomic tasks are allocated to resources according to each of their capabilities. However, in scenarios like search and rescue in a disaster zone or recce of a war zone, the tasks may pop up dynamically and thus initial allocation of tasks to one or more resources of the fog-robot network may not hold good for long and may be required to be changed. For instance, assume a search and rescue mission in a fire zone where there are two robots (Robot A and Robot B) and each of them has a carrying capacity of 100 kg each. At the beginning the robots started with initial load of 50 kg fire extinguishing cylinder each. Now during the mission, Robot A finds a person of weight 60 kg and Robot B finds another person with weight 80 kg waiting to be rescued. If say, the central task allocator has only received information that each robot is carrying 50 kg of load, then ideally the newly evolved task of rescuing the two persons cannot be allocated to any of the robots, because weight of cylinder and person exceeds their carrying capacity. Thus, the two persons will remain un-rescued. But it may be possible that one of the robots has reached its destination and released the cylinder already before meeting the person. If this information is communicated to the central task introducer, then the updated information may indicate "Robot A has a carrying capacity of 100 kg at time instant T1" instead of the old information that "Robot A has carrying capacity of 50 kg at time instant T1". If time stamp of meeting the person is T2 and T2>T1 then the dynamic discovery of resources in real time, in accordance with the present disclosure, facilitates rescue of one of the persons by Robot A at time T2. Thus the dynamic discovery of resources and updating of the semantic knowledge repository with real time scenario of available resources facilitates enhanced performance and resource management which may further facilitate runtime computation offloading. Computation may be offloaded to a resource in the fog-robot network having storage, memory, processing power, battery capacity and such resource data suitable for the computation.

Figure 5:
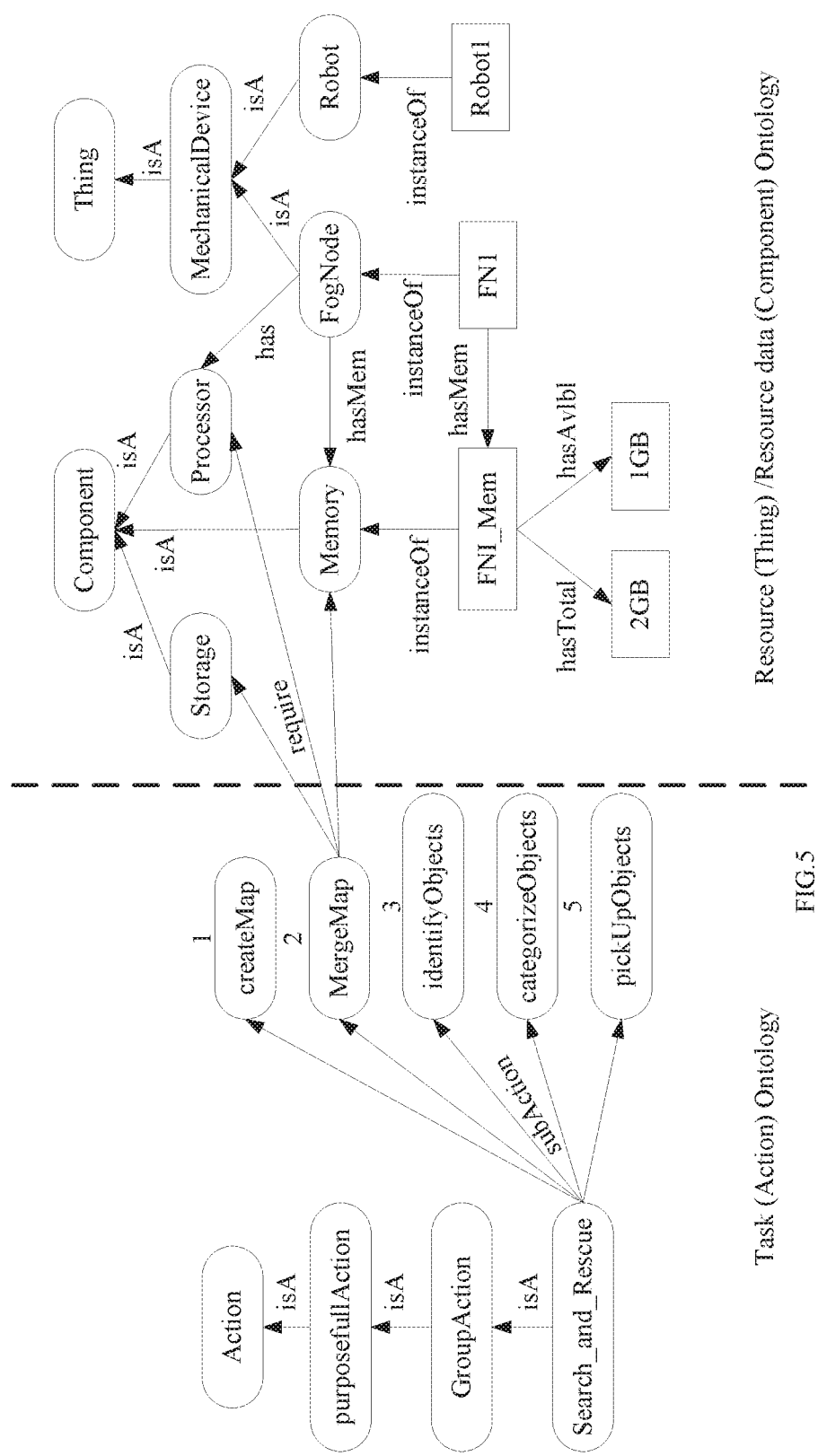
FIG. 5 illustrates an exemplary ontological representation of dynamic discovery of resources captured and stored in the semantic knowledge repository in accordance with an embodiment of the present disclosure.

In accordance with the present disclosure, the ontological structure of the semantic knowledge repository enables storing of runtime capabilities captured as part of resource data. FIG. 5 illustrates an exemplary ontological representation of dynamic discovery of resources captured and stored in the semantic knowledge repository in accordance with an embodiment of the present disclosure. In the exemplary ontological representation, Task (Action) Ontology is illustrated on the left side and Resource (Thing) and Resource data (Component) Ontology is illustrated on the right side. Say FN1 is an instance of FogNode (a device under a generic concept or class Thing) and each fog node may have concept or class storage, memory and processor associated with it. Each of these concepts may have two properties namely hasTotalInitialValue and hasAvailableValue. Say FN1_Mem is an instance of Memory associated with FN1 and it has TotalInitialValue 2 GB and Available Value 1 GB. This means the fog node FN1 has a total runtime memory of size 2 GB and at a time instant T (or at current time T) it has available runtime memory of 1 GB. Thus it can be utilized for performing any computation that requires runtime-memory equal to or less than 1 GB memory. The ontological structure of the present disclosure may be enriched and adapted for any kind of fog-robot network devices. Since task relevant data is only considered, tuple size is optimized thereby making communication between resources easier. Also, semantic representation of information received from heterogeneous resources in ontological structure simplifies interpretation of a long trail of information. Furthermore, dynamic updation of the ontology based semantic knowledge repository provides a realistic view of available resources.

In an embodiment, the one or more processors 104 are configured to allocate, at step 214, the one or more of the tasks to one or more of the plurality of resources in real time based on the dynamically discovered available resources. Real time updation of the semantic knowledge repository ensures effective use of the available resources for various tasks that may have to be deployed to the fog-robot network. Besides allocation of tasks, the system 100 may also identify tasks that may have evolved during runtime. Based on a realistic view of available resources, tasks may be dynamically reallocated for more efficient utilization of the available resources and better task management. Besides identifying resources for allocating tasks, the system 100 may also identify tasks that are necessary for efficient operation of the fog-robot network. For instance, if during runtime, battery capacity of a drone is drained beyond use, the system 100 may identify a task indicative of replacement of the battery in the form of a notification or an alert.

Thus systems and methods of the present disclosure provide means to dynamically discover heterogeneous resources and run time resource data in a fog-robot network operating in a constrained environment (where cloud infrastructure and cloud based knowledge store is not available). The ontology based semantic knowledge repository enables the resources to capture, store and broadcast runtime capabilities associated thereof within the fog layer. Since the framework is based on semantic technology, the heterogeneous resources (i) can exchange information amongst them in a machine understandable format (like RDF/OWL), (ii) can understand the context of the captured data (like understanding meaning of a scene/object/problem in front of them) with the help of the underlying ontology, (iii) can collaboratively take decisions like task allocation (including a decision of not performing a task) intelligently in a completely autonomous system of fog-robot network without dependency on the cloud.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method (200) comprising:
    capturing mission related data by a plurality of resources in a fog-robot network (202);
    capturing resource data associated with the plurality of resources in real time (204);
    performing at least one of (a) identifying contextually, one or more tasks to be performed based on the captured mission related data and (b) receiving one or more tasks to be performed based on the captured mission related data (206);
    identifying task relevant data from the captured resource data and the identified one or more tasks, the task relevant data comprising a set of sub-tasks associated with each of the tasks and required resource data for executing the tasks (208);
    updating in real time, an ontology based semantic knowledge repository of the task relevant data, the one or more tasks and the captured resource data in one or more of the plurality of resources (210); and
    dynamically discovering in real time, one or more of the plurality of resources as available resources based on the semantic knowledge repository (212).

2. The processor implemented method of claim 1, wherein the resource data comprises static capabilities and run time capabilities associated with the plurality of resources.

3. The processor implemented method of claim 1, wherein the ontology based semantic knowledge repository is based on a peer-to-peer network paradigm.

4. The processor implemented method of claim 1, wherein the ontology is written in Web Ontology Language (OWL) and the semantic knowledge repository is Resource Description Framework (RDF) based tuple data store.

5. The processor implemented method of claim 1, wherein the step of updating in real time an ontology based semantic knowledge repository is preceded by a step of creating an ontology based semantic knowledge repository.

6. The processor implemented method of claim 5, wherein the step of identifying contextually or receiving the one or more tasks to be performed is further based on the semantic knowledge repository.

7. The processor implemented method of claim 1, wherein the step of dynamically discovering in real time, one or more of the plurality of resources as available resources comprises exchanging semantic knowledge between the semantic knowledge repository and one or more of the plurality of resources.

8. The processor implemented method of claim 1, further comprising allocating in real time the one or more tasks to one or more of the plurality of resources based on the dynamically discovered available resources (214).

9. A system (100) comprising:
one or more data storage devices (102) operatively coupled to one or more hardware processors (104) and configured to store instructions configured for execution by the one or more hardware processors to:
capture mission related data by a plurality of resources in a fog-robot network;
capture resource data associated with the plurality of resources in real time;
perform at least one of (a) identifying contextually, one or more tasks to be performed based on the captured mission related data and (b) receiving one or more tasks to be performed based on the captured mission related data;
identify task relevant data from the captured resource data and the one or more tasks, the task relevant data comprising a set of sub-tasks associated with each of the tasks and required resource data for executing the tasks;
update in real time, an ontology based semantic knowledge repository of the task relevant data, the one or more tasks and the captured resource data in one or more of the plurality of resources; and
dynamically discover in real time, one or more of the plurality of resources as available resources based on the semantic knowledge repository.

10. The system of claim 9, wherein the resource data comprises static capabilities and run time capabilities associated with the plurality of resources.

11. The system of claim 9, wherein the ontology based semantic knowledge repository is based on a peer-to-peer network paradigm.

12. The system of claim 9, wherein the ontology based semantic knowledge repository of the task relevant data, the one or more tasks and the captured resource data is a Web Ontology Language (OWL) and Resource Description Framework (RDF) based tuple data store.

13. The system of claim 9, wherein the one or more hardware processors are further configured to create the ontology based semantic knowledge repository.

14. The system of claim 13, wherein the one or more hardware processors are further configured to identify contextually or receive the one or more tasks to be performed based on the semantic knowledge repository.

15. The system of claim 9, wherein the one or more hardware processors are further configured to exchange semantic knowledge between the semantic knowledge repository and one or more of the plurality of resources.

16. The system of claim 9, wherein the one or more hardware processors are further configured to allocate in real time the one or more tasks to one or more of the plurality of resources based on the dynamically discovered available resources.

17. A computer program product comprising a non-transitory computer readable medium having a computer readable program embodied therein, wherein the computer readable program, when executed on a computing device, causes the computing device to:
capture mission related data by a plurality of resources in a fog-robot network;
capture resource data associated with the plurality of resources in real time;
perform at least one of (a) identifying contextually, one or more tasks to be performed based on the captured mission related data and (b) receiving one or more tasks to be performed based on the captured mission related data;
identify task relevant data from the captured resource data and the identified one or more tasks, the task relevant data comprising a set of sub-tasks associated with each of the tasks and required resource data for executing the tasks;
update in real time, an ontology based semantic knowledge repository of the task relevant data, the one or more tasks and the captured resource data in one or more of the plurality of resources; and
dynamically discover in real time, one or more of the plurality of resources as available resources based on the semantic knowledge repository.

18. The computer program product of claim 17, wherein the computer readable program further causes the computing device to allocate in real time the one or more tasks to one or more of the plurality of resources based on the dynamically discovered available resources.

* * * * *